L. L. HEPBURN.
MAGAZINE FIREARM.
APPLICATION FILED MAY 12, 1909.
943,828.
Patented Dec. 21, 1909.
5 SHEETS—SHEET 5.
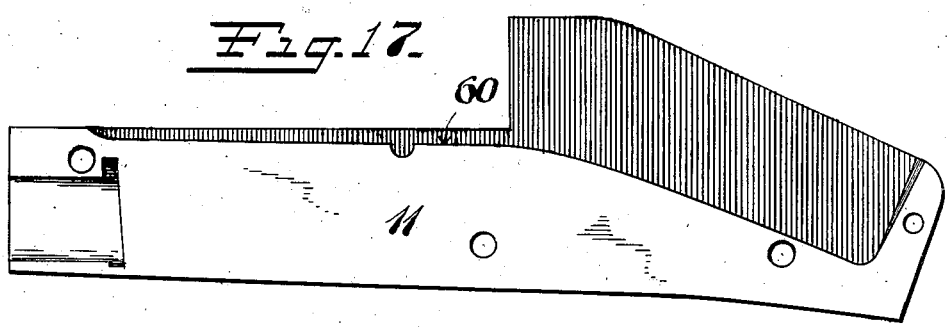
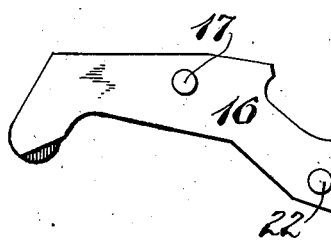  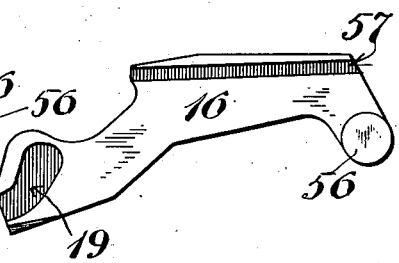
 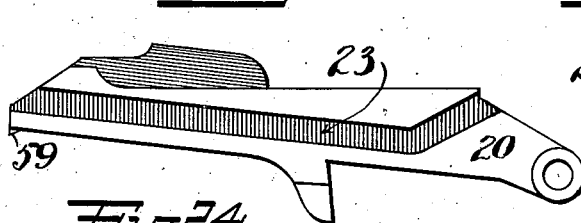 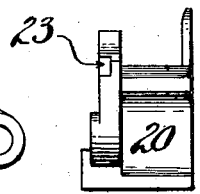
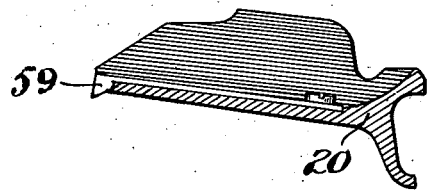
Witnesses:
Chas. A. Peard
Fred M. Dannenfelser
Inventor
L. L. Hepburn
By his Attorneys
Bauer Bromer Mitchell

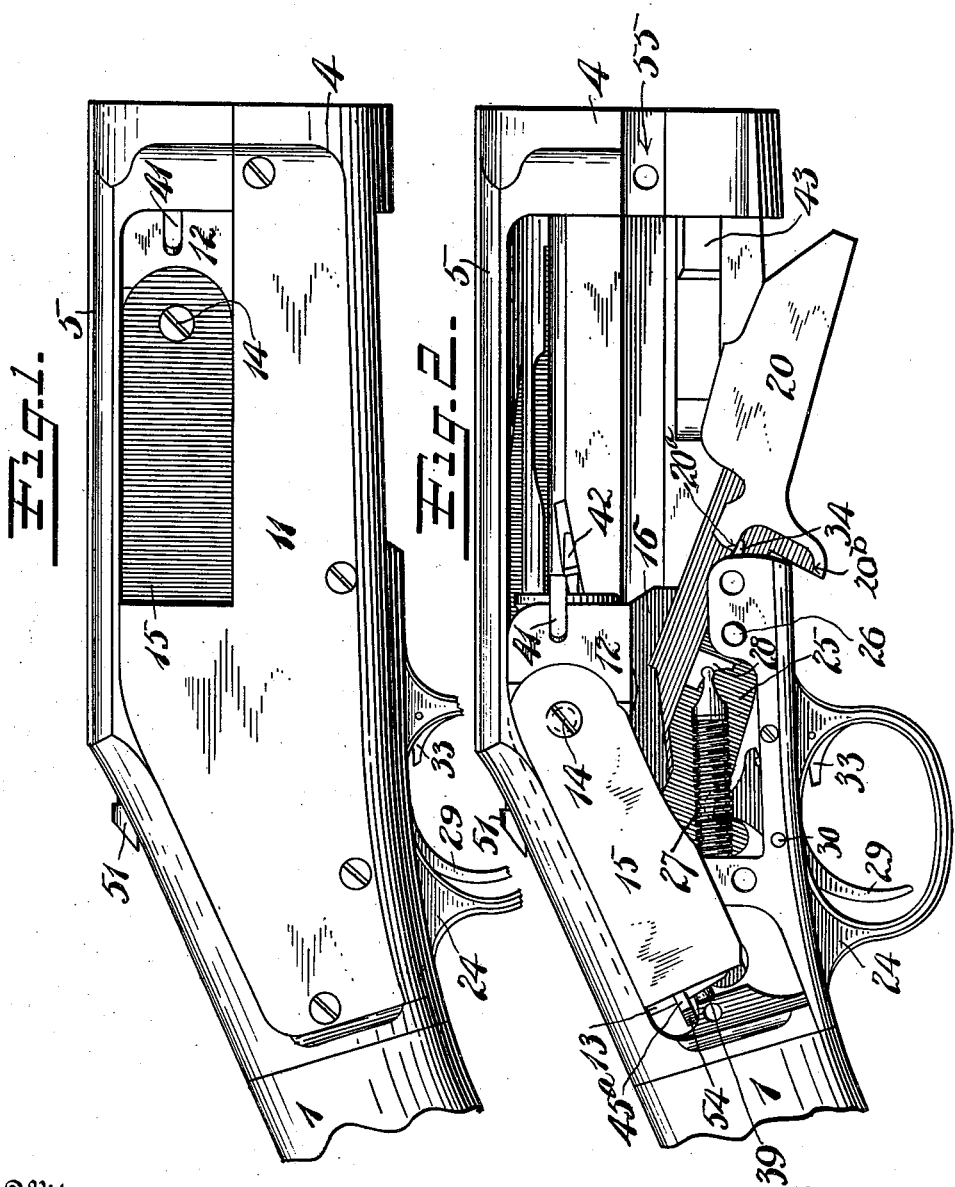

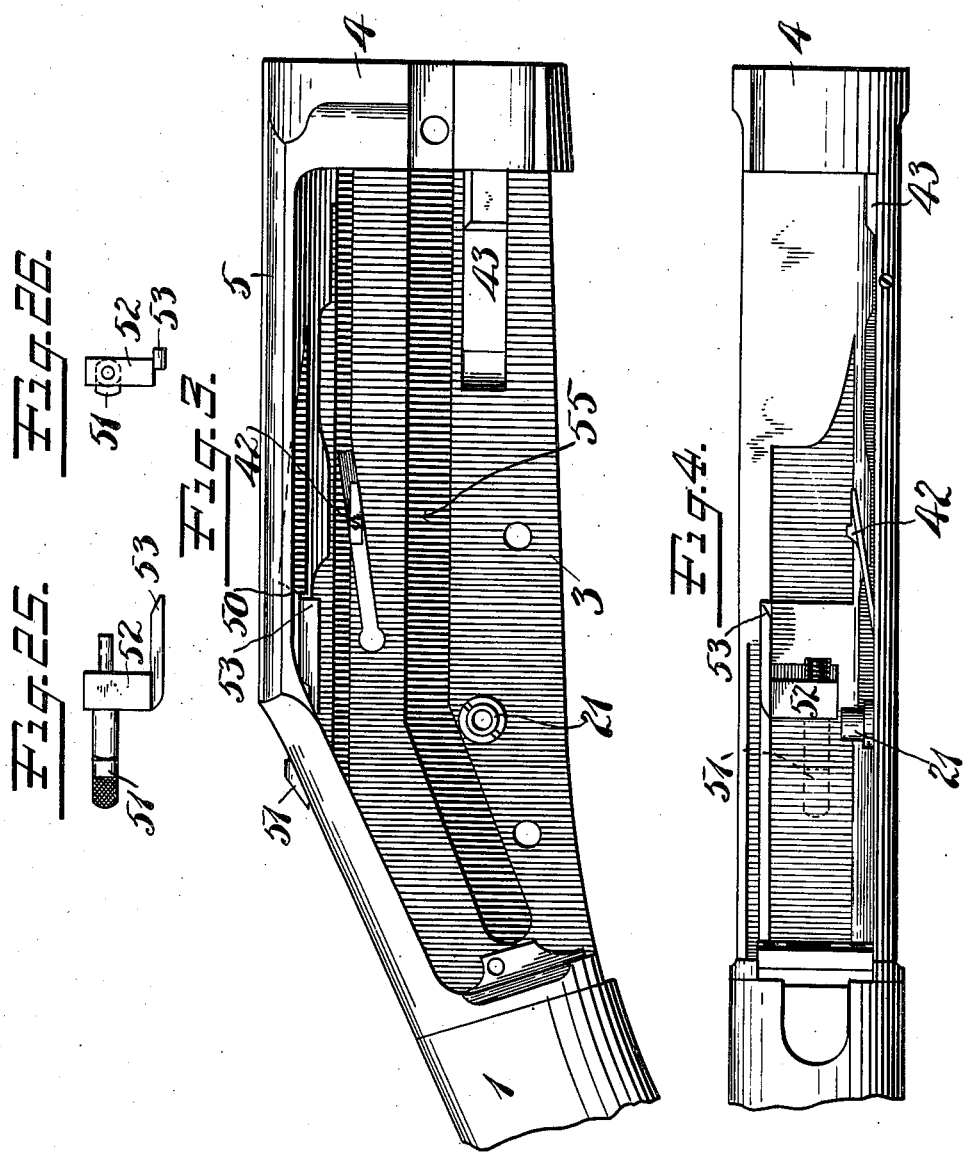

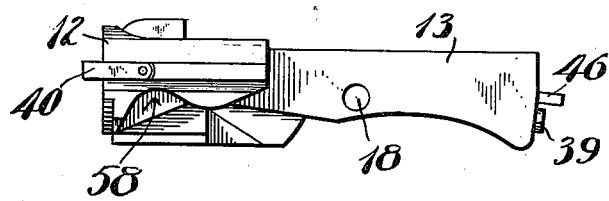
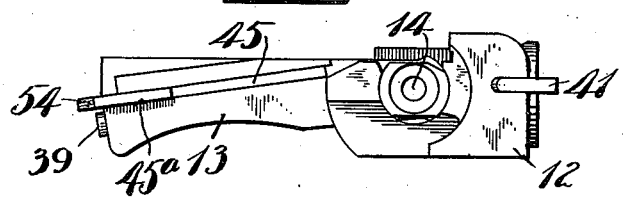
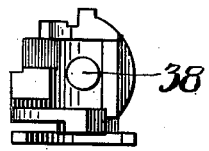
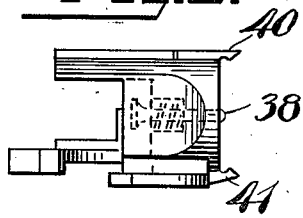
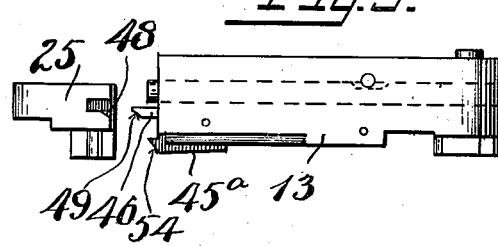
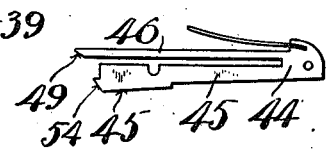

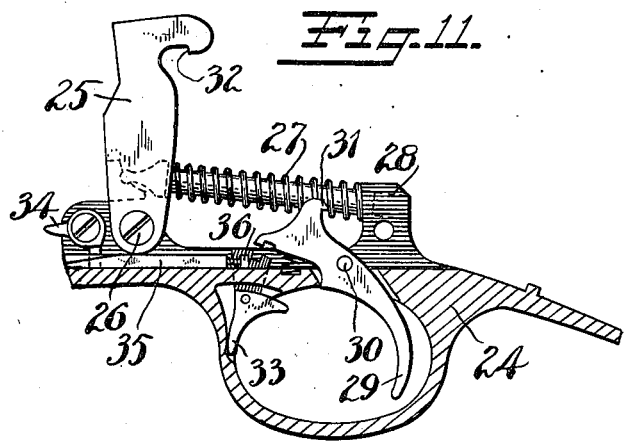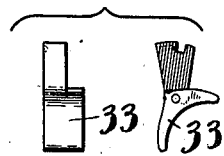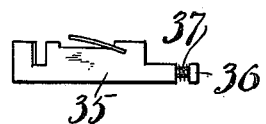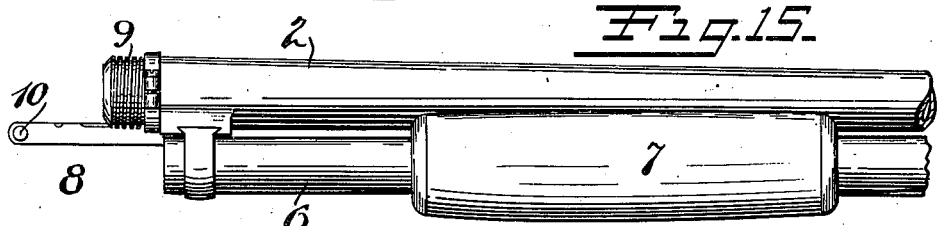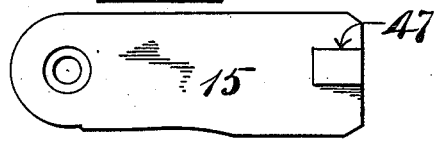

UNITED STATES PATENT OFFICE.

LEWIS L. HEPBURN, OF NEW HAVEN, CONNECTICUT, ASSIGNOR TO THE MARLIN FIREARMS COMPANY, OF NEW HAVEN, CONNECTICUT, A CORPORATION OF CONNECTICUT.

MAGAZINE-FIREARM.

943,828.   Specification of Letters Patent.   Patented Dec. 21, 1909.

Application filed May 12, 1909. Serial No. 495,481.

*To all whom it may concern:*

Be it known that I, LEWIS L. HEPBURN, a citizen of the United States, residing at New Haven, county of New Haven, State of Connecticut, have invented certain new and useful Improvements in Magazine-Firearms, of which the following is a full, clear, and exact description.

My invention relates to improvements in firearms of the "repeating magazine gun" type.

My invention has for its object a variety of improvements in connection with the breech or action mechanism, as will be appreciated by mechanics skilled in the art from a reading of the following specification.

In the drawings Figure 1 is a side elevation of a breech portion of a gun constructed to embody my invention and as it appears when the breech is closed. Fig. 2 is a similar view, the breech being open and the side or cover plate removed to permit the interior mechanism to be seen. Fig. 3 is a view similar to Fig. 2, with most of the interior parts removed. Fig. 4 is a view of the under side of Fig. 3. Figs. 5, 6, 7, 8 and 9 are different views of the breech-block and associated parts, detached from the breech-frame. Fig. 10 is a plan view of a safety device carried by the breech-block. Fig. 11 is a side elevation, partly in section, of the trigger guard showing the trigger and hammer and associated parts. Fig. 12 is an end and side elevation of a detail. Fig. 13 is a plan view of a detail. Fig. 14 is a front and side elevation of another detail. Fig. 15 is a reduced view of the rear end of the barrel and associated parts, including the action rod. Fig. 16 is a movable part of the cover plate for closing the side opening of the receiver. Fig. 17 is an inside view of the main cover plate. Figs. 18, 19 and 20 are different views of the same detail. Figs. 21, 22 and 23 are different views of the carrier. Fig. 24 is a section on the line x—x of Fig. 21, looking from right to left. Fig. 25 is a plan view of a detail of construction. Fig. 26 is a front end elevation thereof.

1 is the stock, 2 is the barrel, 3 is a solid side part of the receiver or breech-frame, 4 is the front reinforce, 5 is the top plate of the receiver. The receiver can be opened at one side whereby the various internal parts may be assembled, in the manner hereinafter described.

6 is the magazine, in this instance arranged under the barrel 2.

7 is a reciprocating handle sliding on the magazine and carrying the action rod 8.

In this instance the gun is of the "take down" variety, the barrel 2 being detachably connected to the reinforce 4 of the receiver by means of a screw-threaded end 9. The magazine 6 and action rod 8 are longitudinally movable to a sufficient extent to first clear the reinforce 4, after which the barrel 2 may be rotated for detachment from said reinforce. When the barrel is to be attached, it is first screwed into place and the magazine 6 is slid back slightly into a cavity at the forward end of the receiver and in the reinforce 4 to hold the parts 2 and 3 against rotation. Following this, the action rod 8 is slid back through a proper opening in the reinforce 4 whereby a pin 10 on the action rod may make connection with a part of the breech mechanism for the purpose of operating the same as hereinafter described.

Now referring to Figs. 1 and 2, 11 is a removable side plate for the receiver held in place in any suitable manner, as by screws. This side plate 11 is cut away at its upper forward end, as best seen in Fig. 1, to provide a side ejection space for empty shells.

The breech-block is of unique formation, in that it comprises two main parts which are hinged together, the forward or head part partaking of a straight reciprocating action, while the rear or tail part partakes of a reciprocating and oscillating motion.

12 is the head part of the breech-block.

13 is the tail part of the breech-block, said parts being suitably hinged to each other upon axis 14 (see Fig. 6).

15 is a plate carried by the breech-block and preferably hinged upon the axis 14. On the opposite side of the breech-block from that shown in Fig. 2 is a rocking member 16 (Figs. 18, 19 and 20). In the particular form shown, this rocking member carries a pivot stud 17 taking into a recess 18 in the breech-block tail 13 (Fig. 5). The pin 10 on the action rod normally stands in a cam slot or groove 19 in the forward end of the tilting member 16 (see Fig. 20). This cam groove is open at its forward end to permit the pin 10 to be drawn forward and disengaged when it becomes desirable to "take down" the gun, but when the parts are assembled ready for use, the pin 10 stands within this groove 19. The groove 19, as shown, is slightly enlarged at its upper end to afford a slight amount of lost motion.

20 is a carrier arranged to perform the usual function and pivoted at 21 on the inner side of the rigid side plate 3.

22 is a stud on the rocking member 16 (Figs. 18 and 19), said stud standing in a cam groove 23 in the adjacent side of the carrier 20. It follows that as the breech-block tail 13 is moved to and fro, the carrier 20 will be moved up and down in accordance with the design of the cam groove 23, which design is suitable to cause said carrier to operate synchronously with the other parts to elevate a cartridge from a position directly to the rear of the magazine 6 to a position directly in front of the breech-block head 12, when the latter is in its retracted position, in order that said cartridge may be introduced into the barrel on the forward excursion of the breech-block.

24 is a frame including the trigger guard and designed to support the hammer, trigger and associated parts.

25 is the hammer pivoted at 26 and arranged to be propelled forward by a pin-guided spring 27 between said hammer 25 and an abutment 28.

29 is a trigger pivoted at 30 and provided with a hook 31 arranged to engage a shoulder 32 on the swinging end of the hammer 25 when the latter is cocked.

33 is a manually-operable safety trip pivoted in the frame 24 and provided with an abutment stop arranged to be shifted (from the position shown) by the swinging of said trip to a position where it prevents the trigger from being pulled sufficiently to release the hammer. The frame 24 also carries a supplemental automatic safety device operated by a bell crank 34. This safety device comprises a slide 35 (Fig. 13) which, when pushed back, will stand under the forward end of the trigger so as to prevent the release of the hammer. The rear end of the slide 35 has a yielding stop 36, normally pressed out by spring 37, the purpose being to prevent injury should the trigger 29 be pulled just preparatory to the pushing back of the slide 35. Should this occur, the stop 36 will, when it encounters the forward end of the trigger, yield momentarily, but the moment the trigger 29 is released so that its forward end will spring up, the stop shoulder 36 will spring back underneath this part of the trigger to block it against action. Since all of these parts are carried by the removable frame 24, they may be conveniently and easily assembled and removed at any time for inspection, repair or replacement.

38 is the firing-pin carried by the head 12 of the breech-block (Fig. 8).

39 is a firing pin coupler carried by the tail 13 of the breech-block, and standing in the path of the hammer 25, so that when the hammer springs ahead, the firing-pin proper 38 will be forced ahead to impinge against the cartridge to explode the same.

40—41 are the usual extractor devices carried by the head 12 of the breech-block.

42 is the usual ejector, carried by the rigid plate 3 of the receiver in proper position to turn the extracted shell and discharge it laterally from the receiver.

43 is the cut-off carried by the rigid plate 3 of the receiver and operated by the forward end of the rocking member 16, as the latter is tilted down at the first part of the rearward movement of the action rod 8.

44 is a laterally movable safety device pivoted in a groove in the tail 13 of the breech-block. This safety device is in the form of a fork, including the two tine members 45 and 46. On the back of the plate 15 is a shoulder or ledge 47, the same being directly below the projecting side 45ª of the tine 45. This position is assumed when the gun is ready for firing and the hammer cocked. The relative position of these parts is best seen in Fig. 9, in which view the upper end of the hammer is also shown for the purpose of illustrating a coöperation between the hammer and this safety device. As shown, this hammer has a recess in its forward side beveled at one side slightly to form a shoulder 48 arranged to engage a bevel 49 at the rear end of fork tine 46. When the hammer springs ahead and strikes the firing-pin, the shoulder 48 engages shoulder 49 and presses back the free end of tine 45. Unless the shoulder 45ª is frictionally bound on the shoulder 47, this will withdraw the part 45 from said shoulder 47, after which it of course follows that the tail 13 of the breech-block may be swung down, for the purpose of unlocking the gun.

50 is a locking abutment on the under side of the top plate 5 of the receiver, up against which the rear end of the tail 13 swings when the gun is loaded and ready for firing. This locks the breech-block and the recoil of the explosion will be transferred directly to a rigid abutment, thereby preventing the breech-block from blowing back.

The function of the safety device 44 is to guarantee the holding of the tail 13 in the locked-up position before and when the gun is fired and against any rearward drag or pull on the operating handle 7 by the operator during the act of aiming the gun. Any rearward pull on handle 7 would obviously have the tendency to unlock the gun, but since the tine 45 rests upon the shoulder 47 when the gun is loaded and cocked, such unlocking will be prevented until released by recoil or let-up of pull on the handle. When the hammer springs ahead and discharges the shell and the safety device 44 is released from shoulder 47, the operator may freely draw back the handle 7, unlock the breech-block and cause the various parts of the breech mechanism to perform the designed functions of extracting and ejecting the empty shell and of bringing a loaded shell into place in the barrel. During this cycle of operations the hammer is cocked automatically by the receding breech-block tail 13.

If at any time it becomes desirable to unlock the gun while a loaded shell is in place, and the hammer is cocked, this is accomplished by means of a manual release shown in Figs. 25 and 26. This manual release comprises a spring-repressed exposed finger piece 51 connected with the internal slide 52 carrying a beveled nose 53, which latter is designed to engage with a bevel 54 on the rear end of tine 45, to shift the latter from engagement with the stop shoulder 47.

As shown in Fig. 2, 55 is a groove in the solid receiver plate 3, the full extent of said groove being shown in Fig. 3. The forward part of this groove is straight and is in line with the rear end of the action rod to receive, guide and steady the same. The rear end of the groove inclines downwardly as best seen in Fig. 3. 56 is a bearing upon the rear end of the rocking member 16 and by which said rocking member is tilted as it follows the groove 55. As will be seen, the tilting action of the rocking member 16 is in a sense compound. After the first unlocking movement, the member 16, as it moves back under the action of the action rod for a short distance, does not tilt. When, however, the bearing 56 engages the rear incline of the groove 55, said member 16 swings down tilting upon the action rod pin 10 and also having a slight tilting movement relatively to the breech block tail 13 on the pivot 17, thus preventing said parts from binding. 57 is a groove in the rear side of the rocking member 16, which affords a clearance for the ejector 42.

58 (Fig. 5) is a notch in the rear side of the breech bolt head 12 to give clearance for the hump at the forward end of the tilting member 16.

From the foregoing, the operation of the gun will be seen to be as follows:—Assuming the gun is put together ready for use and the magazine is filled with cartridges. The operator grasps the action rod and draws the same rearwardly. This operation, through the medium of the tilting member 16, first unlocks the gun by drawing down the tail of the breech bolt from the abutment shoulder 50. Incidentally, this depression of the forward end of the part 16 actuates the cut-off 43 and partially releases a cartridge from the magazine, which engages the carrier 20 or a part thereof, such as clip 59, the rim of the cartridge holding the cut-off 43 repressed. Continued rearward movement of the action rod causes the breech block to recede. As the breech block recedes, the hammer 25 is repressed or cocked, and, as before explained, the tail of the breech block swings down. At the proper moment, the carrier, by reason of the cam action above referred to, is quickly depressed, permitting a single cartridge to escape on to the platform thereof. A forward movement of the action rod reverses the above order of operation, the first movement being to elevate the carrier 20 and present the cartridge in front of the breech block in line with the barrel ready to be forced in thereby as the action rod is drawn ahead. The final forward movement of the action rod after the cartridge is fully introduced into the barrel causes the tail of the breech block to tilt up and engage with the abutment shoulder 50, locking the gun ready for firing. As already explained, any drag upon the action rod handle 7 in the act of aiming the gun, will not unlock the gun by reason of the safety device referred to. When the gun is fired, the hammer advances, releasing the said safety device, after which retraction of the handle 7 unlocks the gun so that the rearward excursion of the parts withdraws the empty shell, ejecting it in the usual manner. When the gun is closed, the cover plate 15 hinged upon the breech bolt and movable therewith, performs the additional function of closing the side ejector space. When the parts are assembled, the rear end of the cover plate is supported by a ledge 60 on the inside of the removable side plate 11, the rear end of which ledge is suitably inclined to permit said cover-plate to tilt down with the tail 13 of the breech bolt.

The safety operating bell crank 34 is automatically actuated by the carrier 20, as will be seen upon reference to Fig. 2. As the carrier descends, a shoulder 20$^a$ strikes the bell crank 34, swinging it so as to force the locking slide 35 rearwardly, to prevent the pull of the trigger. When, however, the carrier 20 rises to the position in which it lines the cartridge up to the rear of the barrel and the breech-block forces the same into the barrel and rises up to the locked position, then the shoulder 20$^b$ strikes said bell crank and withdraws the locking slide 35 from under the trigger.

What I claim is:

1. In a forearm action magazine firearm having a barrel, a receiver, an action slide operating a jointed breech-bolt of an intermediate link, the rear end of which is pivoted in a raceway in the receiver, the middle to the rear arm of the breech bolt, the front end open to receive the cam of the handle slide to change the movement of locking from downward to upward in the receiver.

2. In a firearm, a receiver, a two-part jointed breech-bolt, the rear part being arranged to tilt to lock with the receiver, a side opening for ejecting the shells, an ejecting hole cover pivoted to the breech-bolt near its forward end and traveling therewith on its forward and rearward excursion.

3. A recoil operated locking device consisting of a locking arm and an unlocking arm, a spring for the two always forcing them outward into engagement with a shoulder, an action rod coöperating therewith and so arranged that when rearward pressure is brought to bear on said rod, it puts a pressure on the locking arm and holds it against the tension of the spring when the hammer falls and, until the shock of recoil or release of the handle slide permits it to operate itself.

4. In a firearm, a receiver, a breech block movable to and fro, a breech block locking member carried by said breech block, a safety locking device carried by said breech block locking member, a supporting ledge for said safety locking device, a finger piece mounted in the receiver and carrying a longitudinally extending limb having an incline to push said safety locking device out of engagement with said ledge to release said breech block locking member when the gun is to be opened.

5. An automatic trigger lock consisting of a sliding piece mounted on the trigger plate and operated back and forth by a rocker, an arm of said rocker extending into the path of the carrier as it swings up and down, whereby when the carrier is depressed to its low limit, it strikes the arm of the rocker and forces the slide rearward under the trigger and pulls it out again at the last end of the closing lift, whereby said trigger cannot be pulled at any time before the gun is firmly locked.

6. In a firearm, a hammer having an incline at its tip, a recoil operated locking device pivoted in the locking arm of the breech-bolt consisting of a locking arm and an unlocking arm, a rigid ledge support therefor, a spring for the two always pressing them outward into engagement with said ledge the unlocking arm provided with an incline at the rear end corresponding with an incline in the tip end of the hammer, so when the latter falls on the firing pin, the locking arm is pulled out of engagement and the gun may be opened.

7. In a magazine firearm, a barrel, a receiver, a jointed breech-bolt, an action slide entering the forward end of the receiver, means connecting the rear end of said action slide with said breech-bolt, a cam groove in the receiver, a laterally projecting bearing on said connecting means movable in said groove to change the movement of the rear end of the breech-bolt as said bearing follows the said cam groove.

8. In a firearm, a jointed breech-bolt, a receiver containing said breech-bolt, a portion of said breech-bolt operating as a locking bolt, a side opening in said receiver for permitting the ejecting of the shells, a cover for said side opening pivoted to the breech-block and traveling therewith.

9. In a magazine firearm, a receiver, a breech-block, a locking shoulder on said receiver adjacent to a portion of the breech-block, that portion of the breech-block being movable against said locking shoulder, means to hold said breech-block in the locking position comprising a spring-actuated member projecting across the path of interlocking movement of said breech-block, a hammer, means actuated thereby to release said holding device when said hammer is in a forward position, said holding means being carried by the breech-block and comprising a pivoted fork-like member arranged in the breech-block.

10. In a magazine repeating firearm, action mechanism including a tilting carrier, a trigger, a locking slide for said trigger, coöperating means between said locking slide and said carrier for actuating said locking slide.

11. In a magazine repeating firearm, action mechanism including a tilting carrier, a trigger, a locking slide for said trigger, coöperating means between said locking slide and said carrier for actuating said locking slide, said coöperating means including a bell crank, and two shoulders on said carrier arranged to engage said bell crank on opposite sides to move it in opposite directions.

12. A forked safety device mounted in the breech block, one arm constructed to yield when struck obliquely by the hammer while the other or safety arm is frictionally held at safety when a pull is on the handle.

LEWIS L. HEPBURN.

Witnesses:
F. E. VISEL,
N. W. HANOVER.